United States Patent
Josephson et al.

(10) Patent No.: US 6,660,061 B2
(45) Date of Patent: Dec. 9, 2003

(54) VAPOR PURIFICATION WITH SELF-CLEANING FILTER

(75) Inventors: Gary B. Josephson, Richland, WA (US); William O. Heath, Richland, WA (US); Christopher L. Aardahl, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 27 days.

(21) Appl. No.: 10/013,010

(22) Filed: Oct. 26, 2001

(65) Prior Publication Data

US 2003/0079982 A1 May 1, 2003

(51) Int. Cl.$^7$ .................................................. B03C 3/74
(52) U.S. Cl. ...................... 95/2; 55/282.3; 55/DIG. 10; 95/4; 95/20; 95/68; 95/74; 95/278; 96/18; 96/28; 96/31; 96/67; 588/227
(58) Field of Search .............................. 95/68, 74, 278, 95/20, 21, 2, 4; 96/30, 31, 28, 18, 67; 55/282.3, 282.2, DIG. 10; 588/227

(56) References Cited

U.S. PATENT DOCUMENTS

| | | | |
|---|---|---|---|
| 913,941 A | 3/1909 | Blake | 96/96 |
| 1,428,839 A | 9/1922 | Fortescue | 96/62 |
| 2,746,831 A | 5/1956 | Chapman | 316/26 |
| 3,883,328 A | 5/1975 | Spain | 55/154 |
| 3,933,643 A | 1/1976 | Colvin et al. | 210/243 |
| 4,029,482 A | 6/1977 | Postma et al. | 55/131 |
| 4,052,177 A | 10/1977 | Kide | 55/139 |
| 4,152,183 A | 5/1979 | Honacker et al. | 156/78 |
| 4,222,748 A | 9/1980 | Argo et al. | 55/6 |
| 4,265,641 A | 5/1981 | Natarajan | 55/2 |
| 4,376,637 A | 3/1983 | Yang | 55/2 |

(List continued on next page.)

OTHER PUBLICATIONS

Encyclopedia.com—Results for Plasma, Nov. 2, 2000.
Secondary Treatment of BWID Off–Gas, www.pnl.gov/webtech/bwid/nonterm.html, Nov. 2, 2000.
Zapping VOCs with a discontinuous electric arc, Chemtech 1996, 26(4) 45–49; pubs.acs.org/hotartcl/chemtech/96/apr/zap/html.
Southwest Research Institute News Release, Nov. 20, 1995—SWRI nonthermal plasma reactor neutralizes harmful emissions; www.swri.edu/9 what/releases/plasma.html.
ESP Terminology—APC Network, Mechanical Terms; www.apcnetwork.com/espterms.htm, Nov. 6, 2000.
NIRE Annual Report 1998, Oxidation of Dilute Benzene on a Plasma Reactor Packet with $BaTiO_3$ and $Al_2O_3$ Excited; www.nire.go.jp/annual/1998/7.htm, 1998.
Electrical Precipitator, Electrical Engineering for Pollution Control; www.eas.asu.edu/~holbert/wise/electrostatisprecip.html, Nov. 6, 2000.

(List continued on next page.)

*Primary Examiner*—Richard L. Chiesa
(74) *Attorney, Agent, or Firm*—Woodard, Emhardt, Moriarty, McNett & Henry LLP (57) ABSTRACT

A vapor filtration device including a first electrode, a second electrode, and a filter between the first and second electrodes is disclosed. The filter is formed of dielectric material and the device is operated by applying a first electric potential between the electrodes to polarize the dielectric material such that upon passing a vapor stream through the filter, particles from the vapor stream are deposited onto the filter. After depositing the particles a second higher voltage is applied between the electrodes to form a nonthermal plasma around the filter to vaporize the collected particles thereby cleaning the filter. The filter can be a packed bed or serpentine filter mat, and an optional upstream corona wire can be utilized to charge airborne particles prior to their deposition on the filter.

48 Claims, 7 Drawing Sheets

U.S. PATENT DOCUMENTS

| | | | |
|---|---|---|---|
| 4,405,342 A | | 9/1983 | Bergman .......................... 55/6 |
| 4,419,107 A | | 12/1983 | Roydhouse ....................... 55/5 |
| 4,509,958 A | * | 4/1985 | Masuda et al. ................. 96/60 |
| 4,541,848 A | | 9/1985 | Masuda ........................ 55/139 |
| 4,592,763 A | | 6/1986 | Dietz et al. ...................... 55/2 |
| 4,665,476 A | | 5/1987 | Masuda ........................ 363/86 |
| 4,737,885 A | | 4/1988 | Akutsu ........................ 361/225 |
| 4,954,320 A | | 9/1990 | Birmingham et al. .. 422/186.04 |
| 4,978,372 A | | 12/1990 | Pick ............................ 55/132 |
| 5,217,511 A | | 6/1993 | Plaks et al. .................... 55/124 |
| 5,236,672 A | | 8/1993 | Nunez et al. .......... 422/186.04 |
| 5,254,231 A | | 10/1993 | Heath et al. ................. 204/164 |
| 5,405,422 A | | 4/1995 | Ueda et al. ................. 55/282.3 |
| 5,542,967 A | | 8/1996 | Ponizovsky et al. ............ 96/82 |
| 5,573,577 A | | 11/1996 | Joannou ........................ 96/66 |
| 5,582,632 A | | 12/1996 | Nohr et al. ..................... 95/78 |
| 5,679,264 A | * | 10/1997 | Gsell .......................... 210/767 |
| 5,800,790 A | | 9/1998 | Imamura et al. ............. 422/174 |
| 5,807,425 A | | 9/1998 | Gibbs ............................ 96/66 |
| 5,827,407 A | | 10/1998 | Wang et al. ................. 204/164 |
| 5,843,288 A | | 12/1998 | Yamamoto ................. 204/164 |
| 5,972,075 A | | 10/1999 | Fukuda et al. ................. 96/15 |
| 5,993,521 A | | 11/1999 | Loreth et al. ................... 96/69 |
| 6,027,616 A | | 2/2000 | Balsko-Malyi .............. 204/164 |
| 6,038,854 A | | 3/2000 | Penetrante et al. ........... 60/297 |
| 6,063,150 A | | 5/2000 | Peter et al. ................. 55/282.3 |
| 6,106,592 A | | 8/2000 | Paranjpe et al. ................ 95/65 |
| 6,117,216 A | | 9/2000 | Loreth ........................... 96/62 |
| 6,129,781 A | | 10/2000 | Okamoto et al. ............... 96/25 |
| 6,136,278 A | | 10/2000 | Eliasson et al. ........ 422/186.04 |
| 6,156,099 A | | 12/2000 | Hironaka et al. ............... 95/74 |
| 6,245,126 B1 | * | 6/2001 | Feldman et al. ............... 95/59 |

OTHER PUBLICATIONS

Definition of PLASMA from Internet search of encyclopedia.com, dated Nov. 2, 2000, 1 page.

Definition and explanation of NTP Technology from pnl.gov Internet site dated Nov. 2, 2000, 11 pages.

Czernichowski and Ranaivosoloarimanana, "Zapping VOCs with a Discontinuous Electric Arc", Chemtech 1996 from Internet pubs.acs.org dated Nov. 2, 2000, 9 pages.

News Release, "SwRI nonthermal plasma reactor neutralizes harmful emissions", Southwest Research Institute from Internet site swri.edu dated Nov. 2, 2000, 2 pages.

ESP Terminology from Internet site apcnetwork.com dated Nov. 6, 2000, 12 pages.

"Oxidation of dilute Benzene on a Plasma Reactor Packed with $BaTiO_3$ and $Al_2O_3$ Excited", NIRE Annual Report 1998 from Internet site nire.go.jp dated Nov. 2, 2000, 2 pages.

Electrical Engineering for Pollution Control, from Internet site eas.asu.edu dated Nov. 6, 2000, 2 pages.

* cited by examiner

Fig. 6 sUS 6,660,061 B2

VAPOR PURIFICATION WITH SELF-CLEANING FILTER

This invention was made with Government support under Contract Number DEAC0676RL01830 awarded by the U.S. Department of Energy. The Government has certain rights in the invention.

FIELD OF THE INVENTION

The present invention is directed to a method and device for removing particulates from vapor streams. More particularly, but not exclusively, it is directed to removing carbonaceous particles from vapor or gas streams using a self-cleaning filter.

BACKGROUND OF THE INVENTION

The levels of particulate matter in the air is a matter of growing concern. A major source of particulate matter pollution are the exhaust gasses from power plants, manufacturing operations, and internal combustion engines. Accordingly, removal of particulates from these and other vapor streams prior to the vapor stream reaching the atmosphere is an important step in controlling particulate matter pollution.

Typically, removal of particulate matter from vapor streams is performed with electrostatic precipitators or particulate traps. In each of these methods, a vapor stream is passed through a device where particulate matter from the vapor stream is physically collected in the precipitator or trap. In most cases, the collected matter accumulates on the precipitator or trap, eventually clogging or otherwise reducing the efficiency of the device. Thus, periodically, the precipitator or trap must be emptied of collected material or the filter replaced. This process can be time consuming and expensive since the device must ordinarily be taken off line and at least partially disassembled and/or reconditioned before being placed back in operation. Disposal of the collected material or spent filter introduces further difficulties and waste.

In some cases, attempts have been made to clean precipitators or traps automatically and without requiring that they be taken off-line. For example, the temperature in the device around the collected particles can be elevated to a point that collected particles combust. However, numerous design and implementation difficulties exist in constructing devices that can achieve and withstand the stressful conditions of elevated temperatures and/or extended operating temperature ranges. Moreover, elevated temperatures can, in certain cases, adversely influence the chemistry of particle combustion, limit the choice of available materials, or otherwise reduce the overall efficiency of collection and disposal of particulates.

A need exists for improved systems and techniques that can efficiently remove particulates from vapor streams for longer periods before requiring attention. A need also exists for improved systems and techniques that can remove particulates and dispose of the removed particulates in an efficient and cost effective manner. A need also exists for a particulate filter that can be regenerated without requiring substantially elevated temperatures and/or needing to be taken off line. One or more of these or other needs are met by one or more embodiments of the present invention.

SUMMARY OF THE INVENTION

In one embodiment there is provided a novel technique for removing particulates from a vapor stream. In one refinement, the technique includes depositing particulates onto filter material and then vaporizing the collected particulates using a nonthermal plasma. Where the filter includes dielectric material, the dielectric is polarized by application of a first potential across a pair of electrodes around the filter to electrically collect particulates from the vapor stream. The nonthermal plasma is then formed by periodically applying a second higher potential across the pair of electrodes to vaporize the collected particulates. In further refinements the nonthermal plasma is automatically formed in response to deposition of a predetermined quantity of particulates, where the predetermined quantity is determined by monitoring the pressure drop across the filter. In a still further refinement, the filter material includes a catalyst active under nonthermal plasma conditions to assist vaporization of collected particulates at reduced power consumption.

There is also disclosed a novel vapor filtration device comprising a first electrode, a second electrode, and a filter between the first and second electrodes. The filter can be formed of dielectric material and the device operated by applying a first electric potential between the electrodes to polarize the dielectric material such that upon passing a vapor stream through the filter, particles from the vapor stream are deposited onto the filter. After depositing the particles a second higher voltage can then be applied between the electrodes to form a nonthermal plasma around the filter to vaporize the collected particles thereby cleaning the filter. In particular refinements, the filter is packed a bed or a serpentine filter mat.

In one advantageous aspect, the invention provides a technique where collected particulates can be vaporized without requiring elevated temperatures. In another aspect, a technique is provided where a nonthermal plasma vaporizes collected particulates to regenerate a particulate collection system without requiring the system to be taken off line. In still another aspect, an automated system for collecting and vaporizing particulates from a vapor stream to reduce pollution in a cost effective manner is provided. In yet a further aspect, a novel filtration system with a self cleaning filter is provided.

DESCRIPTION OF EMBODIMENTS

For the purposes of promoting and understanding of the principles of the invention reference will now be made to the embodiments illustrated in the drawings and specific language will be used to describe the same where like reference numerals will be used to refer to like features. It will nevertheless be understood that no limitation of the scope of the invention is thereby intended, any alterations and further modifications in the illustrated embodiments, and any further applications of the principles of the invention as illustrated herein being contemplated as would normally occur to one skilled in the art to which the invention relates.

Figure 1:
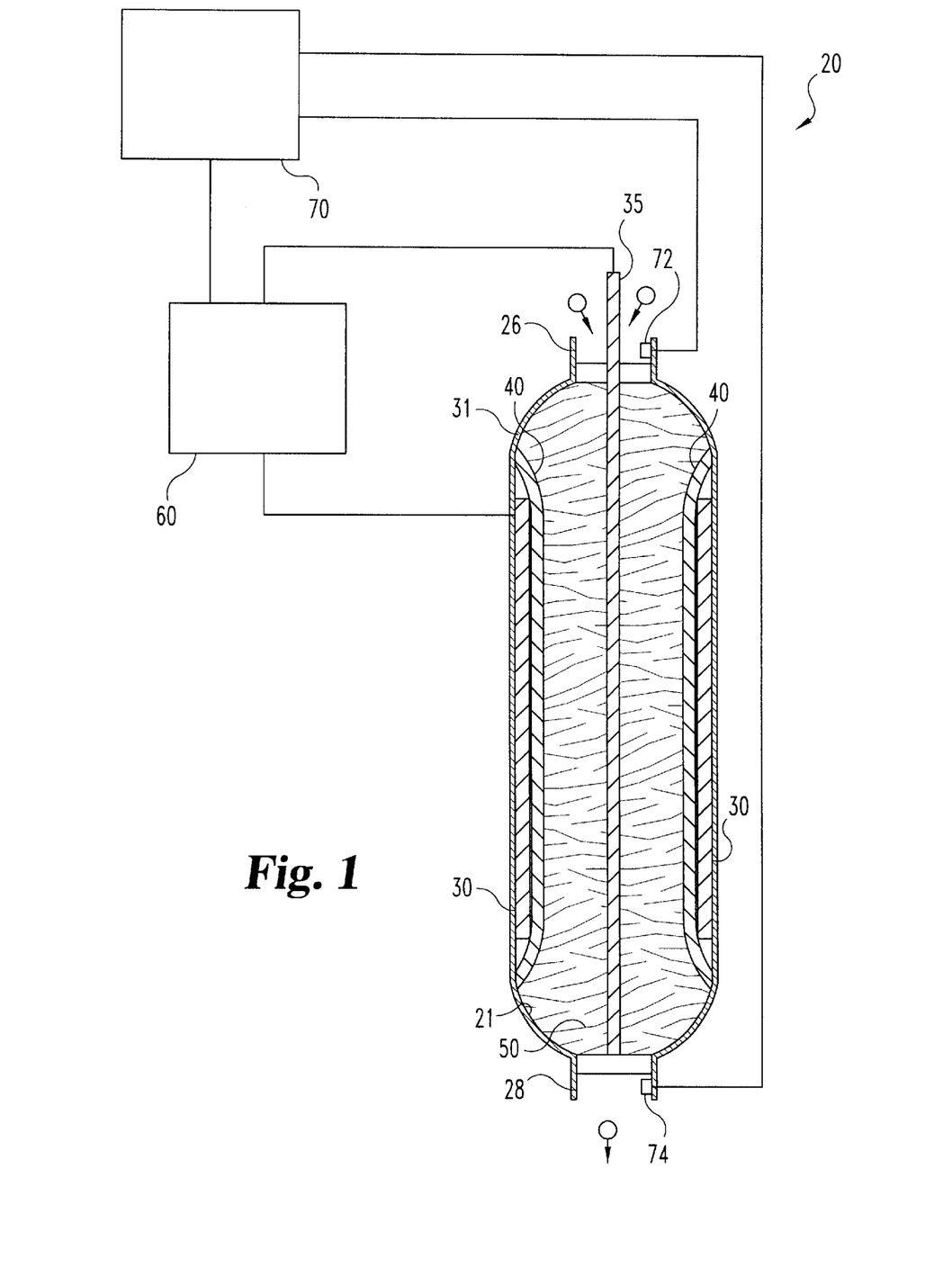
FIG. 1 is a side view in partial section of a filtration system according to an embodiment of the present invention with portions of the system illustrated schematically.

Turning now to FIG. 1, a device 20 for removing particles from a vapor stream is depicted. The device 20 includes a housing 31 defining a chamber 21 having a vapor inlet 26 and a vapor outlet 28. An electrode 35 runs down the center of the device 20 and is surrounded by filter material 50. Outer electrode 30 is on the outside of filter material 50 and is separated therefrom by dielectric barrier 40.

A power supply 60 is connected between the inner and outer electrodes 35 and 30 respectively and is operable to selectively apply an electric field between the electrodes and into the filter material 50. Control system 70 includes an analog or digital controller connected to the power supply and is adapted to control application of the electric field. Control system 70 is adapted to control the duration, magnitude, form, or any other property of the applied electric field. As described more fully below, control system 70 is most preferably configured to change the applied field so as to make the energy deposited onto the filter material 50 vary between two different levels.

Control system 70 is also configured to receive signals from sensors 72 and 74 at the inlet and outlet of the device 20, where sensors 72 and 74 can be, for example, pressure transducers or flow rate sensors. Sensors 72 and 74 provide a signal to control system 70 regarding the pressure drop through the filter, the volumetric flow rate of vapor through the filter, or any other signal relating to a property of the vapor flow through the device 20. Control system 70 preferably includes a computer including a processor and memory (not shown) for analyzing signal inputs, comparing the received inputs to predetermined criteria, and controlling the power supply 60 based on predetermined instructions.

Power supply 60 is adapted to apply a first voltage between electrodes 35 and 30 to polarize the filter material. The filter 50 is adapted to be polarized by the applied voltage and can be formed as a nested fiber filter, packed bed, or other configurations of filter particles. The filter material is constructed of, for example, glass, ceramic, minerals, titania, and combinations thereof. The filter material can be in the form of, for example, fibers, packing, foam, of combinations thereof. In one aspect, the filter material is at least partially formed of a dielectric material with a dielectric constant of at least about 3. In other aspects, the dielectric constant can be between about 3 and 50,000. Examples of other useful filter materials include, without limitation, alumina fibers or extruded forms, or catalyst coated dielectrics. It should be understood that when, for example, catalyst coatings are employed, any metal loading is preferably low enough such that the packing does not become conductive.

In use, a vapor stream to be treated is passed through the device from the inlet 26 to the outlet 28, with the vapor passing through the filter material 50 while the electric field is applied and/or the dielectric material of the filter 50 is polarized. Selected particles in the vapor stream are then electrically deposited onto the filter material. The vapor stream exits the device 20 with the concentration of the selected particulates) substantially reduced. Preferably device 20 alone is sized and configured to remove any selected particulate from the vapor stream in sufficient quantity such that the particulate level in the outlet stream is at an acceptable level, though it is understood that other similar devices or any conventional vapor purification techniques could also be employed in series with device 20 to further treat the vapor stream.

Through use as described above, particulates from the vapor stream will deposit on the filter material and might accumulate in the device 20 in undesired quantities. When accumulation begins to influence particle collection, control system 70 signals power supply 60 to apply a second higher voltage between electrodes 35 and 30. The higher voltage between the electrodes is applied to form a nonthermal plasma around at least a portion of the filter material 50. The nonthermal plasma creates charged carriers in the gas phase that accumulate on the airborne and deposited particulates. The nonthermal plasma also creates active oxidizing species which chemically attack any collected particles to clean the filter of the collected particles. Various types and sizes of particulate matter, such as for example small carbon containing particles, can be collected and vaporized in this manner.

Generally this higher voltage is applied in response to deposition of a predetermined amount of particulate matter onto the filter. This amount can be determined by the pressure drop, as determined relative to sensors 72 and 74, exceeding predetermined limits and is preferably a substantial amount. A substantial amount would be any amount that can produce a measurable change in the filter material. For example, the measurable change might be an increase in mass, a change in color, or a change in overall dielectric constant attributable to the deposition.

Alternatively or in addition, the deposition amounts can be determined from the duration of operation or the time of deposition. In this case, the second higher voltage is applied to form the nonthermal plasma after the device has operated for a predetermined period of time between successive formations of the nonthermal plasma. This time can depend on several factors, such as the content and concentration of particulates in the vapor stream, and the effects of prior operation, such as any accumulation on the filter that was not entirely removed in prior cleanings. Preferably the time between successive formations of the cleaning nonthermal plasma, and/or the time the collected particles remain on the filter material between cleanings, is substantial. An example of a substantial time would be at least about 0.1 times or on the order of the residence time of the chamber, which is conventionally defined as the volume of the chamber 21 divided by the volumetric flow rate of the vapor through the chamber 21. More preferably, the time it is at least about equal to and more preferably much longer than the residence time of the chamber 21. For example, the time can be at least about 5–10 times the residence time and in certain cases may be 100–1000 times the residence time of the chamber 21.

Figure 2:
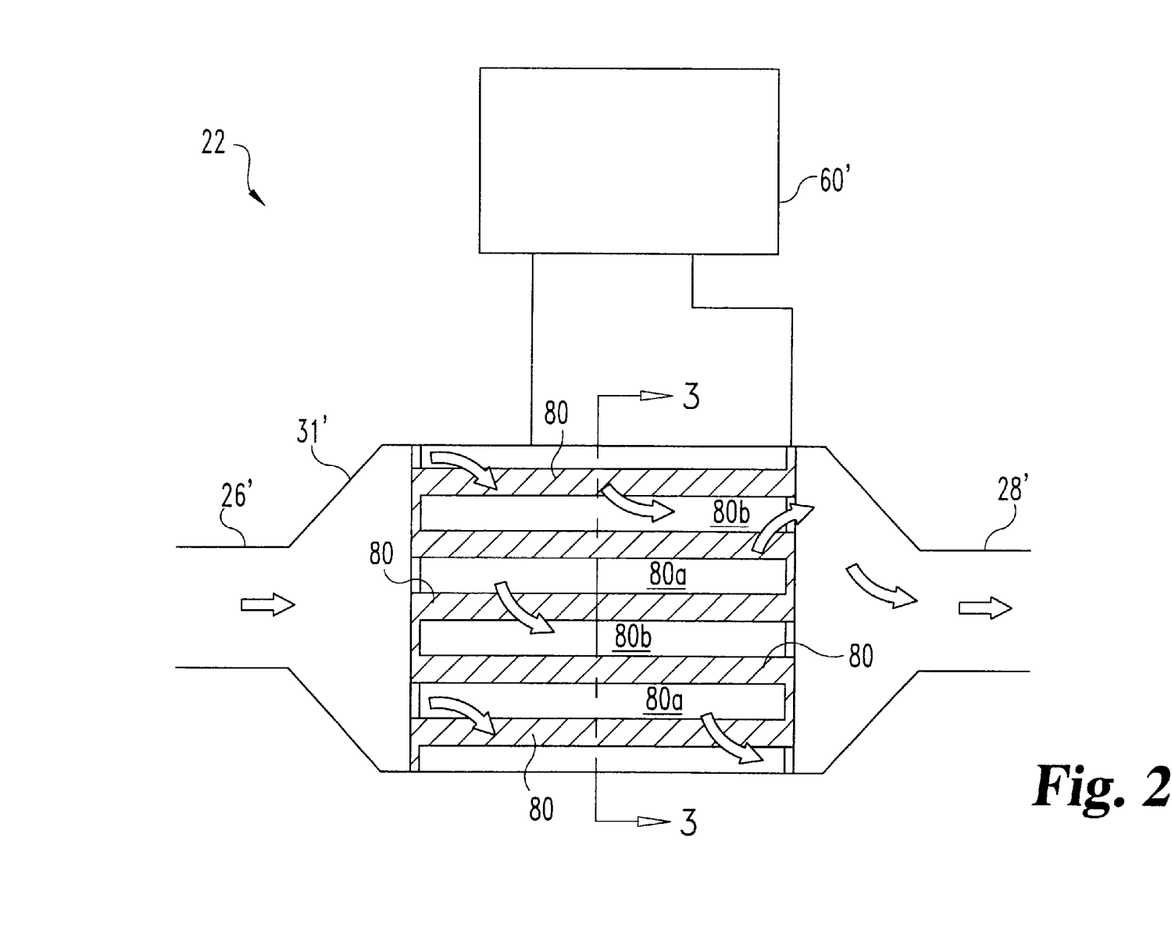
FIG. 2 is a schematic illustration of the airflow through a portion of a filtration system according to another embodiment of the present invention.

Turning now to FIG. 2, an alternative arrangement for a filtration device 22 is depicted. Device 22 also is used as described above to filter particulates from a vapor stream and includes a filter material in a housing 31' between an inlet 26' and an outlet 28'. However, whereas device 20 included a fibrous filter bed, device 22 includes a plurality of serpentine or repeating S-shaped filter pads 80 for collecting particulates from a vapor stream as the vapor stream travels through the filter pads 80. The pads 80 are positioned in the device such that the passing vapor stream is directed to travel through the pads 80 from the inlet side 80a to the outlet side 80b as indicated by the arrows. Accordingly, the air flow of the passing vapor stream is blocked at the ends of the pads 80 leaving openings to direct the air flow in the desired direction.

Figure 3:
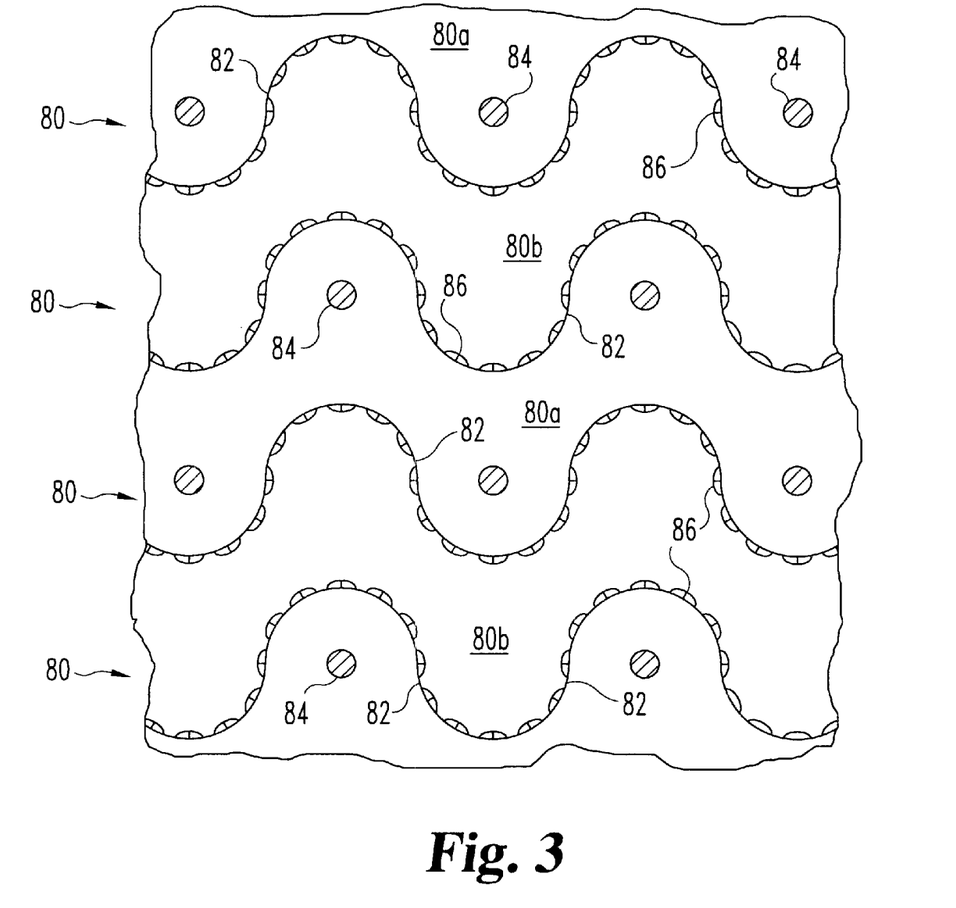
FIG. 3 is a cutaway sectional view of the filter section of the FIG. 2 filtration device.

Turning now to FIG. 3, particular features of the serpentine filter pads 80 of device 22 are illustrated. Each filter pad 80 includes a filter mat 82 formed of dielectric material. The material can be any suitable dielectric material, such as those used with respect to device 20. Mat 82 is also formed or supported to define a serpentine or wavy configuration. Generally centered in the troughs of the waves and on the upstream side 80a of pad 80 are electrodes 84. Counterelectrodes 86 are positioned on the downstream side 80b of pad 80. Counterelectrodes 86 also serve as supports for filter mat 82 and are formed as a wire mesh.

Figure 3B:
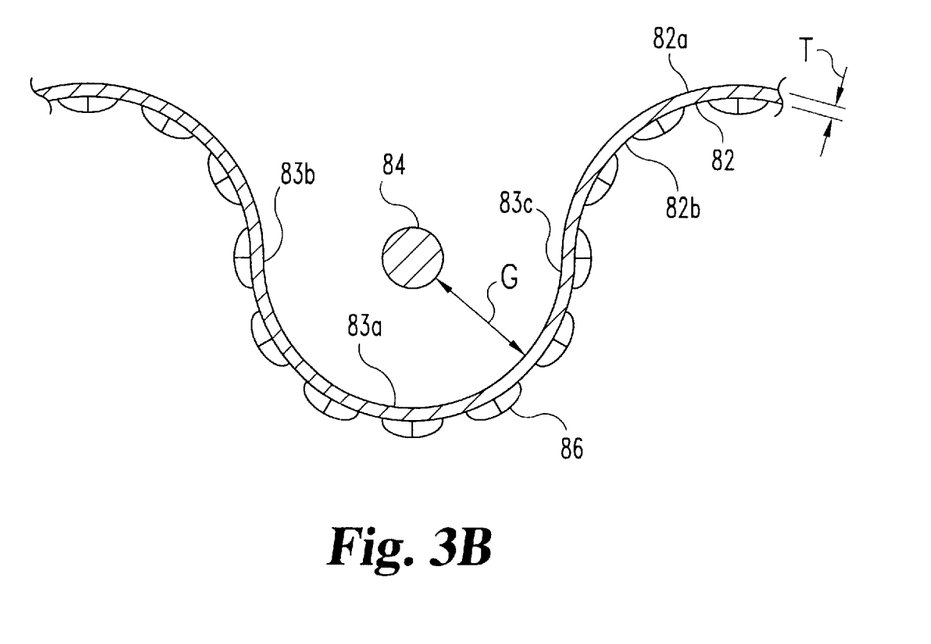
FIG. 3B is an enlarged sectional view of a portion of the serpentine filter from FIG. 3.

With reference to FIG. 3B, within the trough of one of the curves, the filter mat 82 has upstream and downstream surfaces 82a and 82b respectively and a thickness T. Electrode 84 is spaced from surface 82a and defines air gap G. Air gap G is preferably substantially constant for a substantial portion of the trough of the filter mat 82, with gap G defining the radius of curvature for the S-curves of the filter mat 82. For example, filter mat 82 can have a generally circular profile through portions 83a, 83b, and 83c with electrode 84 at the center of the circular profile. Preferably the gap G is maintained between about 0.5 cm and 2.0 cm, and the thickness T is preferably less than about 0.5 mm.

In use, power supply 60' applies an electric field between electrodes 84 and counterelectrodes 86. This potential is applied through the air gap G surrounding each electrode 84 and the potential is of sufficient strength to polarize the filter material in filter 82 to assist particle collection. Device 22 also preferably includes a controller, sensors and/or a timer (not shown) as described with respect to device 20 above for controlling the applied electric field.

As discussed above with respect to device 20, after a period of time power supply 60' also applies a second higher voltage to form a nonthermal plasma in device 22. The plasma is formed in and around the dielectric filter material. Since electrode 84 is spaced from the filter material, an operator can tailor the strength of the applied field to form the plasma only within or around the fiber mat 82, and the nonthermal plasma need not fill the entire air gap G. Alternatively, a stronger field can be applied to fill substantially the entire gap G with the formed plasma.

Figure 4:
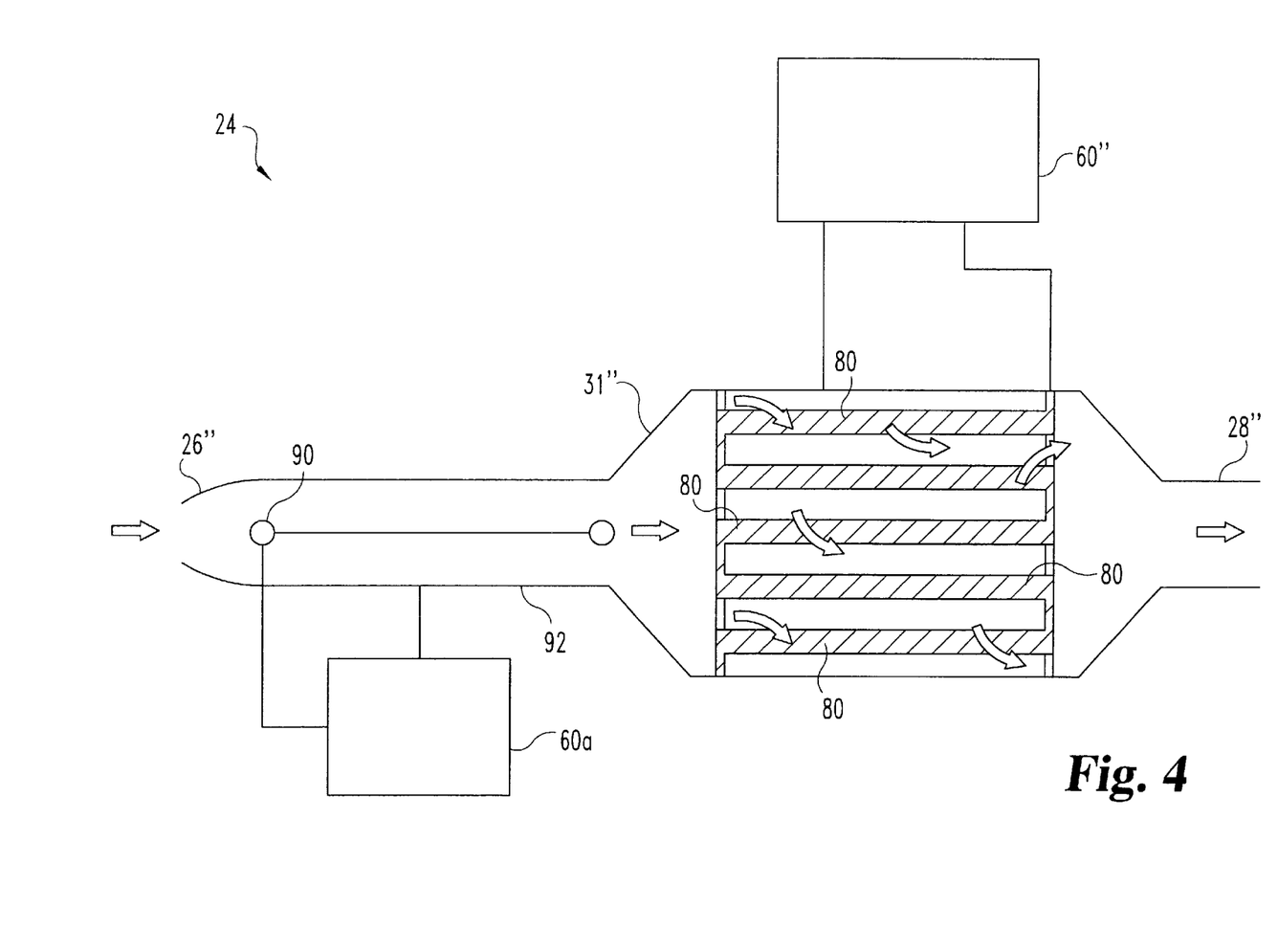
FIG. 4 is a schematic illustration of the airflow through a portion of a filtration system according to another embodiment of the present invention.

Turning now to FIG. 4 an alternative arrangement for a filtration device 24 is depicted. Disposed in housing 31" between inlet 26" and outlet 28", device 24 includes a plurality of serpentine filters 80, although more or less serpentine filters 80 can be included. Device 24 could also include, either in addition to or in place of serpentine filters 80, a packed bed or fibrous filter such as included in the device 20 of FIG. 1 that substantially fills the entire space between the pair of electrodes. Device 24 also can optionally include the control system and sensors described with respect to device 20.

In the device 24 of FIG. 4, in addition to the downstream filter 80 being connected to power supply 60", an upstream corona wire 90 is provided inside of ground portion 92 and is powered by power source 60a. In operation, the corona wire 90 can be operated to produce an electric field and to assist the charging of particles in the vapor stream as they pass through the corona wire portion prior to entering the filtration section. The corona discharge at wire 90 produces charge carriers that can attach to passing particulates to charge the particulates and facilitate their electrical deposition on the filter.

Figure 5:
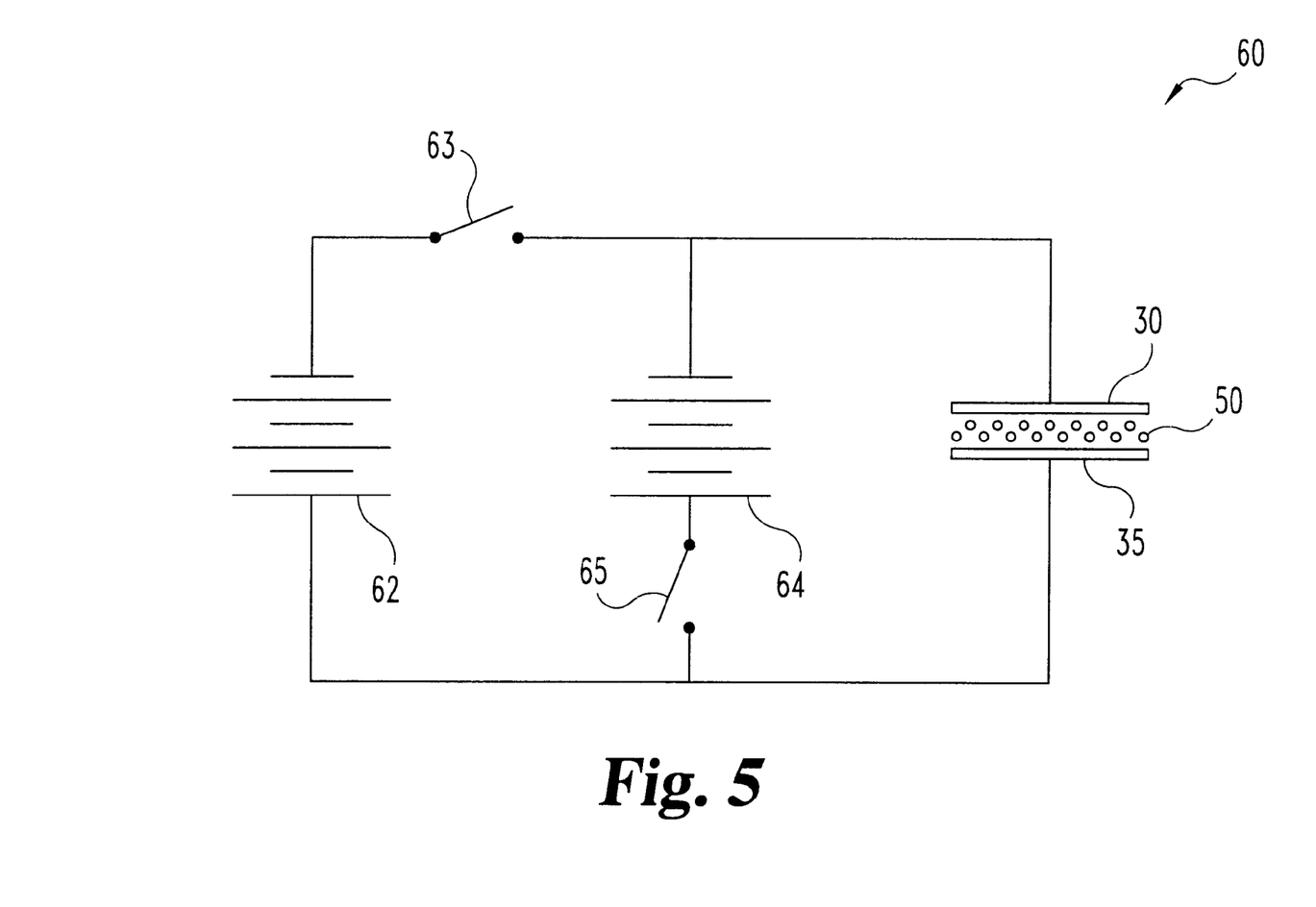
FIG. 5 is a schematic illustration of a circuit diagram for a filtration device according to the present invention.

Turning now to FIG. 5, power supply 60 is schematically illustrated. Power supply 60 includes a pair of sources of electric potential 62 and 64. Source 64 provides a base potential between electrodes 30 and 35 sufficient to polarize the filter material 50. This base potential can be fairly low and can typically range between about 50 and 2000 Volts (V), for example between 500 and 2,000V. Periodically, switches 65 and 63 are operated to select power supply 62, which provides a relatively greater potential between electrodes 30 and 35. The large electric potential provided by power supply 62 is sufficient to deposit enough energy onto the filter material 50 to create a nonthermal plasma in the filtration region. This second larger potential can typically range between about 2,000 and 35,000V, for example between 8,000V and 30,000V. It is also contemplated that the nonthermal plasma condition can be created utilizing a pulsed corona processor or a dielectric barrier processor as is known in the art and is described in U.S. Pat. No. 6,038,854 to Penetrante et al. which is hereby incorporated by reference in its entirety. It should also be understood that power supplies 60' and 60" can be similarly configured.

While power supply 62 and 64 are shown as separate sources of a DC current they could be a single source whose output is variably adjustable. In still further embodiments, one or more of source 62 or 64 could be an AC power source with either a fixed or variable power output. In one variation, the lower base potential is applied as a direct current, and the higher nonthermal plasma inducing potential is applied as an alternating current or as a pulsed direct current.

It is contemplated that any of the devices depicted herein can be either continuously or periodically operated with an applied potential, either as a AC current, a DC current or a pulsed DC current, so as to place or maintain the filter into the nonthermal plasma mode, with actual voltages, currents, and/or repetition rates determined as would occur to those of skill in the art. Where the fiber filter fills substantially the entire volume between the electrodes, the nonthermal plasma can be formed throughout the volume of the filter, for example as in device 20. Alternatively where serpentine filters 80 (See FIG. 3) are used, the applied voltage can be sufficient to form a nonthermal plasma just around the filter 82 and a portion of the air gap between filter 82 and electrode 84, but not filling the entire volume between filter 82 and electrode 84.

While not intending to be bound by any theory of operation, it is believed that the formed plasma imparts charge on the particles moving through the filter with the gas. The charge enhances the collection of particles on the fibers or the filter mat due to attractive forces between induced dipoles. If the particles are carbonaceous, for example being organic, biological or biogenic, or containing inorganic carbon such as soot, the active oxidizing species formed by the nonthermal plasma attacks the particles and oxidizes them to, for example CO and $CO_2$ gas, that then pass through the filter. The oxidation effectively vaporizes and removes the particles, thus cleaning the filter and prolonging the filter life. Depending upon the configuration a nonthermal plasma could be created within the entire volume between electrodes or only within the filter material itself.

Alternatively or in addition, any of the devices disclosed herein can be operated at a lower potential where a nonthermal plasma is not formed around the filter material in sufficient quantity to oxidize all of the collected particles. Accordingly, particles will collect on the filter surface and, after a sufficient number have collected, will begin to clog the filter and/or reduce collection efficiency. When it is determined that the filter has become clogged, control system 70 signals an operator and/or causes the power supply to increase the voltage or applied energy to form a nonthermal plasma in or through the filter material. It is contemplated that a nonthermal plasma can be created by any of the techniques described herein and/or by any conventional technique.

Alternatively or in addition to any of the operational procedures described above, the vapor concentration can be monitored, for example by control system 70, while the nonthermal plasma is on and/or collected particles are actively being vaporized/oxidized. The nonthermal plasma can then be turned off when maintenance of the nonthermal plasma condition becomes unwarranted. For example, the nonthermal plasma can be turned off when the monitored vapor concentrations indicate that little oxidation is continuing and/or oxidation is not occurring at efficient levels. Such indication might be, for example, the rate of oxidized species generation or the amount of oxidized species being generated dropping below a predetermined amount. Alternatively, a time could be used to direct the shut-down of the nonthermal plasma.

Alternatively or in addition to any of the operational procedures described above, an upstream corona wire can be utilized to produce corona discharges or to form an upstream nonthermal plasma to oxidize vapor species and create charged carriers in the gas to help assist particle collection. In this embodiment the downstream filter materials can be polarized or charged by the application of an even lower electric field and still provide adequate particle capture.

It is envisioned that the devices and methods disclosed herein can be used to collect fine particles from any vapor stream. Particular vapor streams can be carbonaceous vapor streams such as the exhaust gases from power plants, manufacturing operations, or fossil fuel burning engines.

It is also envisioned that the filter material can be any material capable of serving as a particle filter to collect particles from vapor streams by any method, for example by impaction, adsorption, or electrical interaction. Examples of suitable filter materials include, without limitation, glass, ceramics, and/or polymers or composites thereof, where preferred filter materials are non-conductive ceramics and polymeric materials or composites thereof. In one advantageous aspect, the filter material is also selected to be catalytically active in the formed nonthermal plasma. Examples of nonthermal plasma catalytically active materials useful in the present invention include, without limitation, precious metal-doped alumina, various metal chlorides, and various metal oxides. More particular examples include ferric oxide, ceria, vanadia, pervoskite-type oxides, anatase phase titanium dioxide, and platinum/palladium coatings on alumina support. It is also envisioned that a mixture between catalyticaly active filter particles and non-catalyticaly active filter particles, or particles composed of varying types of material, can also be employed.

EXAMPLES

Tests were performed with a packed bed filtration apparatus with a center electrode configured according to device 20 of FIG. 1. The filter chamber was approximately 1 inch in diameter and approximately 4 inches long. Graphite particles at an initial concentration of about 1–50 $mg/m^3$ were passed at 1 atmosphere pressure at a volumetric flow rate of 10 liters per minute. For some of the runs, the packed bed filter material were nested glass fibers made from broken quartz fiber optic glass (approximately 10 micrometers in diameter and 3mm–8mm in length). For other runs, the filter material were cylindrical pellets of anatase titanium dioxide (approximately 3 mm in diameter and 6 mm in length).

Figure 6:
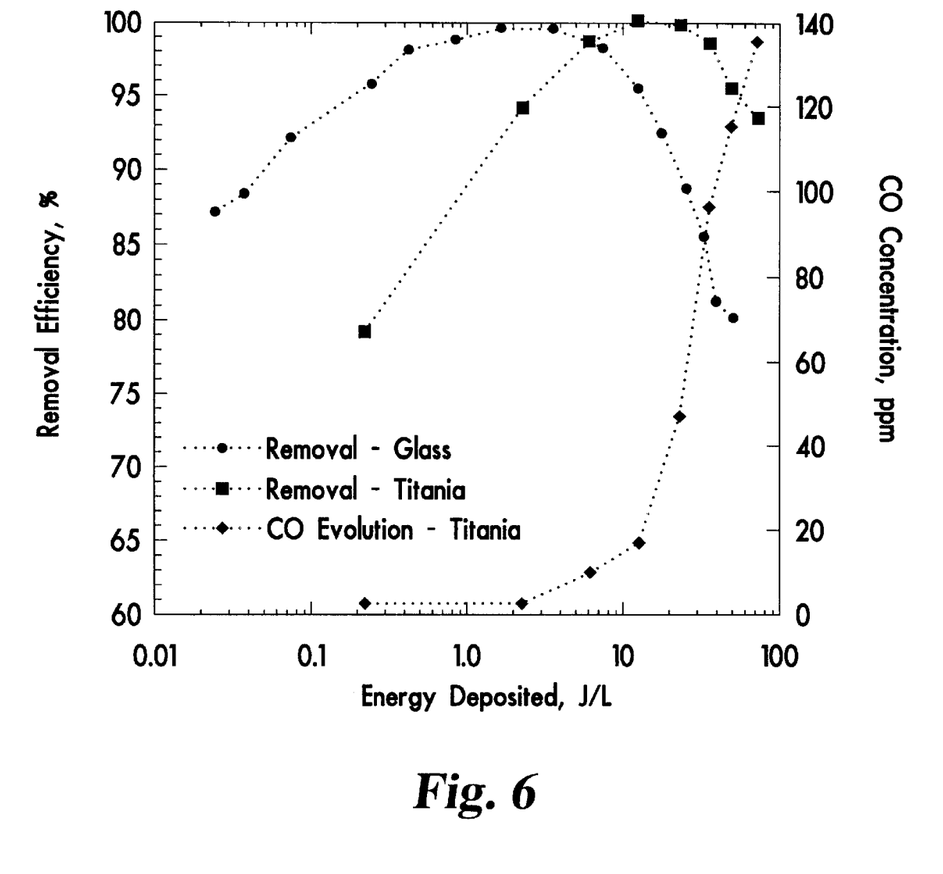
FIG. 6 is an exemplary plot of removal efficiency and vapor evolution versus deposited energy.

Turning now to FIG. 6, data representing the removal efficiency and CO evolution plotted as a function of the energy deposited are depicted. The energy was deposited with a single AC discharge variable output voltage source. As can be seen from the plots in FIG. 6, as the power input increases, collection efficiency also increases until it reaches a maximum and then begins to drop. It is believed that this maximum and subsequent drop is an artifact of the AC discharge in that the packing becomes highly charged at higher power input. It is believed that the charge counteracts the collection forces as the AC cycle flips potential prior to complete particle collection. This effect appears to become increasingly parasitic to particle collection as the power is increased.

As can also be seen from the plot in FIG. 6, very efficient particle capture occurs at low power consumption, but oxidation of the particles, as evidenced by CO production, does not take place until moderate power input. In addition while CO evolution was clearly evident for the titania packing, CO evolution did not occur in significant amounts until higher energy inputs for the glass packing. Accordingly this indicates that titania is catalyticaly active for particle oxidation in the nonthermal plasma created at the higher energy inputs.

For the runs depicted in FIG. 6, the collection efficiency was seen to steadily increase with increasing applied voltage between about 500 and about 4,000 V. When the applied voltage was above about 4,000 V and between about 5,000 to 6,000 V the packing was observed to enter a nonthermal plasma mode which was also observed up until at least about 12,000 V. The onset of the nonthermal plasma mode was indicated by a visual glow and observation of a phase shift between the voltage and current waveforms measured on an oscilloscope with inputs from the input voltage and from a capacitor in the line to the ground electrode.

As can be appreciated by those of skill in the art, there has been described herein a novel method of purifying a vapor stream comprising, providing a vapor filtration device comprising a first electrode, a second electrode, and a filter between the first and second electrodes, the filter including dielectric material, applying a first electric potential across the filter to polarize at least a portion of the dielectric material, passing a vapor stream through the filter, depositing an amount of non-gaseous material from the vapor stream onto the filter, after depositing the amount of non-gaseous material, applying a second higher electric potential across the filter to form a nonthermal plasma that vaporizes at least a portion of the deposited non-gaseous material. One refinement of the method includes determining the amount of deposited non-gaseous material, for example by monitoring the pressure drop or vapor flow rate through the filter, and applying the second higher electric potential when the determined amount exceeds a predetermined limit. In another refinement, the method includes operating a corona wire upstream from the filter to ionize a portion of the vapor prior to passing the vapor through the filter. In other refinements, the electric potential is applied through a dielectric barrier or an air gap between the electrodes.

There has also been described a novel method of purifying a vapor stream comprising delivering a vapor stream into a housing defining an inlet, an outlet, and a chamber between the inlet and the outlet, providing a filter in the chamber, electrically depositing material from the vapor stream onto the filter, and after depositing an amount of material onto the filter, cleaning the filter by forming a nonthermal plasma around at least a portion of the filter. In one refinement, the filter material is dielectric and the method includes polarizing the dielectric with an applied potential and then depositing the particulates on the polarized dielectric material. In other refinements, the filter is cleaned by vaporizing a substantial portion of the deposited material. In still further refinements, the cleaning is successively performed with the period between successive cleanings greater than the residence time of the chamber.

There has also been described a novel apparatus comprising a chamber having an inlet and an outlet, a filter in the chamber, the filter comprising dielectric material, at least two electrodes on opposing sides of the filter, at least one source of an electric potential connected to selectively apply a potential between the at least two electrodes to polarize the dielectric material and to form a nonthermal plasma around at least a portion of the filter, and a controller connected to the at least one source for selectively controlling application of the electric potential to form the nonthermal plasma, the controller adapted to select formation of the nonthermal plasma in response to the occurrence of at least one predetermined condition. In one refinement, the controller receives at least one signal representing the pressure drop across the filter. In another refinement, the at least one source includes a first and a second source of an electric potential connected to the at least two electrodes, and the first source is adapted to apply a potential to the at least two electrodes to polarize at least a portion of the filter, and the second source is adapted to apply a potential to the at least two electrodes sufficient to form a nonthermal plasma around at least a portion of the filter. In another refinement, the electric potential to polarize the filter may be DC, pulsed DC, or AC power, and the electric potential to form the nonthermal plasma may be pulsed DC or AC electric power. In another refinement, the filter includes a fiber mat defining first and second surfaces facing the electrodes and a having a thickness between the electrodes wherein at least one electrode is spaced from the fiber mat a distance at least equal to the thickness of the fiber mat. In a further refinement, this distance can be substantially greater than the thickness of the fiber mat such that the nonthermal plasma can be formed primarily around the fiber mat.

There has also been described a vapor purification device with a self cleaning filter comprising a chamber having an inlet and an outlet, a serpentine filter in the chamber, the filter comprising dielectric material, and means for forming a nonthermal plasma around at least a portion of the filter to clean the filter, the means for forming a nonthermal plasma including a plurality of electrodes and at least one source of an electric potential connected to the plurality of electrodes and configured to apply a potential across the filter to form a nonthermal plasma around at least a portion of the filter, wherein the plurality of electrodes are each positioned generally between successive curves of the filter and spaced from the filter such that the nonthermal plasma can be formed primarily around the filter to clean the filter. In certain refinements, the filter includes a fiber mat defining first and second surfaces and having a thickness between the surfaces, and wherein the plurality of electrodes are spaced from the fiber mat a distance at least equal to the thickness of the fiber mat. In other refinements, the plurality of electrodes are spaced from the fiber mat a distance substantially greater than the thickness of the fiber mat. In still other refinements, the device includes a controller connected to the electric potential source for selectively controlling application of the electric potential to form the nonthermal plasma, the controller adapted to select formation of the nonthermal plasma to clean the filter according to at least one predetermined criteria.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding. All publications, patents, and patent applications cited in this specification are herein incorporated by reference as if each individual publication, patent, or patent application were specifically and individually indicated to be incorporated by reference and set forth in its entirety herein.

We claim:

1. Method of purifying a vapor stream comprising:

providing a vapor filtration device including a first electrode, a second electrode, and a filter including dielectric material between the first and second electrodes, applying a first electric potential across the filter to polarize at least a portion of the dielectric material and to thereby deposit an amount of non-gaseous material from a passing vapor stream onto the filter, and after depositing the non-gaseous material for a period of time, applying a second higher electric potential across the filter to form a nonthermal plasma around at least a portion of the filter to vaporize at least a portion of the deposited non-gaseous material.

2. The method of claim 1 further comprising:

applying the second higher electric potential when the amount of deposited non-gaseous material exceeds a predetermined limit.

3. The method of claim 2 wherein the amount of deposited non-gaseous material is determined by monitoring the pressure drop through the filter, and wherein the second higher electric potential is applied when the pressure drop exceeds a predetermined limit.

4. The method of claim 2 wherein the amount of deposited non-gaseous material is determined from the amount of vapor passing through the filter, and wherein the second higher electric potential is applied after a predetermined amount of vapor passes through the filter.

5. The method of claim 1 further comprising operating a corona wire upstream from the filter to ionize at least a portion of the vapor stream prior to passing the vapor stream through the filter.

6. The method of claim 1 wherein the deposited non-gaseous material includes carbon containing compounds.

7. The method of claim 1 wherein the first electric potential is applied as a direct current, a pulsed direct potential, or an AC potential.

8. The method of claim 1 wherein the nonthermal plasma is formed with a pulsed direct current discharge.

9. The method of claim 1 further comprising:

providing a device having a housing defining a chamber having at least one inlet and at least one outlet with the filter in the chamber, wherein the vapor stream has an average flow rate through the chamber during the depositing of the non-gaseous material on the filter, the average flow rate and the chamber size defining a residence time of the chamber, successively applying the second higher electric potential wherein the time between successive applications of the second higher electric potential is at least about equal to the residence time of the chamber.

10. The method of claim 9 wherein the time between successive applications of the second higher potential is substantially greater than the residence time of the chamber.

11. The method of claim 1 further comprising:
providing a dielectric barrier between the electrodes and the filter,
applying the second higher potential through the dielectric barrier.

12. The method of claim 1 further comprising providing a catalyst in the filter, wherein the catalyst enhances oxidation of the non-gaseous material with the nonthermal plasma.

13. The method of claim 12 wherein the catalyst is a dielectric material.

14. The method of claim 13 wherein the filter includes titania or titanium dioxide.

15. The method of claim 1 wherein the filter includes nested fibers.

16. The method of claim 1 further comprising:
providing an air gap between an electrode and the filter, and
applying the first electric potential through the air gap.

17. The method of claim 16 wherein the air gap is substantially constant over a substantial portion of the filter.

18. The method of claim 17 wherein the filter is a fiber mat.

19. The method of claim 4 wherein a property of the vapor is monitored while the nonthermal plasma is on and the nonthermal plasma is turned off in response to a characteristic of the monitored vapor property exceeding predetermined limits.

20. The method of claim 19 wherein the monitored vapor property is a concentration of a vapor constituent and the nonthermal plasma is turned off when the monitored concentration indicates little oxidation is continuing.

21. A method of purifying a vapor stream comprising:
electrically depositing material from a vapor stream onto a filter, wherein the filter is in a housing defining an inlet, an outlet, and a chamber between the inlet and outlet,
after depositing an amount of material onto the filter for a period of time, cleaning the filter of the deposited material by forming a nonthermal plasma around at least a portion of the filter.

22. The method of claim 21 wherein the filter includes dielectric material, the method further comprising:
polarizing the dielectric material by applying a first electric potential to the material,
electrically depositing material from the vapor stream onto the polarized dielectric material.

23. The method of claim 21 further comprising:
forming the nonthermal plasma when the amount of deposited material exceeds a predetermined limit.

24. The method of claim 23 wherein the amount of deposited material is determined by monitoring the pressure drop through the filter.

25. The method of claim 21 wherein cleaning the filter includes oxidizing a substantial portion of the deposited material.

26. The method of claim 21 wherein the filter includes a catalyst, and wherein the catalyst enhances oxidation of the deposited material.

27. The method of claim 21 wherein the vapor stream has an average flow rate through the chamber, the average flow rate and the chamber size defining a residence time of the chamber, the method further comprising:
successively cleaning the filter with the nonthermal plasma, wherein the time between successive cleanings is substantially greater than the residence time of the chamber.

28. The method of claim 27 wherein the deposited material includes carbon containing compounds.

29. An apparatus for purifying vapor streams comprising:
a chamber having an inlet and an outlet,
a filter in the chamber, the filter including dielectric material,
at least two electrodes on opposing sides of the filter,
at least one source of an electric potential connected to selectively apply a potential between the at least two electrodes to polarize the dielectric material and to form a nonthermal plasma around at least a portion of the filter, and
a controller connected to the at least one source for selectively controlling application of the electric potential to form the nonthermal plasma, the controller adapted to select formation of the nonthermal plasma according to at least one predetermined criteria.

30. The apparatus of claim 29 wherein the controller receives at least one signal representing the pressure drop across the filter and the at least one predetermined criteria is the pressure drop exceeding a predetermined limit.

31. The apparatus of claim 29 wherein the at least one source includes a first and a second source of an electric potential connected to the at least two electrodes, the first source adapted to apply a potential to the at least two electrodes to polarize at least a portion of the filter, the second source adapted to apply a potential to the at least two electrodes sufficient to form a nonthermal plasma around at least a portion of the filter.

32. The apparatus of claim 29 wherein the filter is a nested fiber filter.

33. The apparatus of claim 29 wherein the filter includes a fiber mat defining first and second surfaces facing the electrodes and having a thickness between the electrodes, and
wherein at least one electrode is spaced from the fiber mat a distance at least equal to the thickness of the fiber mat.

34. The apparatus of claim 33 wherein at least one electrode is spaced from the fiber mat a distance substantially greater than the thickness of the fiber mat such that the nonthermal plasma can be formed primarily around the fiber mat.

35. The apparatus of claim 34 wherein the fiber mat is serpentine and electrodes of the same pole are placed between successive corresponding curves of the fiber mat.

36. A vapor purification device with a self cleaning filter comprising:
a chamber having an inlet and an outlet,
a serpentine filter in the chamber, the filter including dielectric material,
a plurality of electrodes and at least one source of an electric potential connected to the plurality of electrodes, the plurality of electrodes configured to apply a potential across the filter to form a nonthermal plasma around at least a portion of the filter, wherein electrodes of the same pole are positioned between successive corresponding curves of the filter and spaced from the filter such that the nonthermal plasma can be formed primarily around the filter to clean the filter.

37. The device of claim 36 wherein the filter includes a fiber mat defining first and second surfaces and having a thickness between the surfaces, and wherein the plurality of electrodes are spaced from the fiber mat a distance at least equal to the thickness of the fiber mat.

38. The apparatus of claim 37 wherein the plurality of electrodes are spaced from the fiber mat a distance substantially greater than the thickness of the fiber mat.

39. The device of claim 36 further comprising:

a controller connected to the at least one source for selectively controlling application of the electric potential to form the nonthermal plasma, the controller adapted to select formation of the nonthermal plasma to clean the filter according to at least one predetermined criteria.

40. The device of claim 36 wherein the plurality of electrodes include counterelectrodes in contact with the serpentine filter.

41. The device of claim 37 wherein the plurality of electrodes include counterelectrodes in contact with the fiber mat.

42. A method comprising:

electrically collecting material from a vapor stream onto a filter, wherein the filter is in a housing defining an inlet, an outlet, and a chamber between the inlet and the outlet, after collecting material onto the filter for a period of time, cleaning the filter of the collected material by forming a nonthermal plasma around at least a portion of the filter, and repeating the electrically collecting after the cleaning.

43. The method of claim 42 wherein the vapor stream has an average flow rate through the chamber, the average flow rate and the chamber size defining a residence time of the chamber, and wherein the period of time is at least about equal to the residence time of the chamber.

44. The method of claim 42 wherein the filter includes dielectric material and the dielectric material is polarized by application of a first electric potential across the dielectric material during the electrical collection.

45. The method of claim 44 wherein a second larger electric potential is applied across the dielectric material to form the nonthermal plasma.

46. The method of claim 42 wherein cleaning the filter occurs in response to a measured property of the vapor stream meeting predetermined criteria.

47. The method of claim 42 wherein cleaning the filter occurs until a measured property of the vapor stream meets predetermined criteria.

48. The method of claim 42 wherein the collected material includes carbon containing compounds.

* * * * *